(12) United States Patent
Calder

(10) Patent No.: US 6,763,967 B2
(45) Date of Patent: Jul. 20, 2004

(54) VALVE BOX LOCKING LID AND METHOD THEREFOR

(76) Inventor: L. Rodger Calder, 900 N. 400 W. Bldg. 9, North Salt Lake, UT (US) 84054

( * ) Notice: Subject to any disclaimer, the term of this patent is extended or adjusted under 35 U.S.C. 154(b) by 0 days.

(21) Appl. No.: 10/426,129

(22) Filed: Apr. 29, 2003

(65) Prior Publication Data

US 2003/0201269 A1 Oct. 30, 2003

Related U.S. Application Data

(60) Provisional application No. 60/376,484, filed on Apr. 29, 2002.

(51) Int. Cl.[7] .............................................. B65D 115/16
(52) U.S. Cl. .............................. 220/325; 52/20; 404/25; 220/323
(58) Field of Search ................................. 220/325, 328, 220/323, 327, 681, 304, 795, 301.1, 345.6, 803, 804, 806; 404/25, 69; 403/260; 137/371; 52/20, 21, 19

(56) References Cited

U.S. PATENT DOCUMENTS

| 135,822 | A | * | 2/1873 | Laforge | 137/371 |
|---|---|---|---|---|---|
| 458,525 | A | * | 8/1891 | Farlow | 114/174 |
| 969,776 | A | * | 9/1910 | Foley | 137/371 |
| 969,881 | A | * | 9/1910 | Klemm | 137/371 |
| 1,229,429 | A | * | 6/1917 | Farley | 137/371 |
| 3,227,183 | A | * | 1/1966 | Hecht | 138/89 |
| 4,074,941 | A | * | 2/1978 | Jablonski | 403/260 |
| 4,461,597 | A | * | 7/1984 | Laurin | 404/25 |
| 6,488,440 | B1 | * | 12/2002 | Hill | 404/25 |
| 6,584,734 | B2 | * | 7/2003 | Mihalicz et al. | 52/19 |

* cited by examiner

*Primary Examiner*—Lien Ngo
(74) *Attorney, Agent, or Firm*—Jeffrey Weiss; Harry M. Weiss; Weiss, Moy & Harris, P.C.

(57) ABSTRACT

A locking lid and method for a valve box. The locking lid has a closure and surrounding external seal, which fit into the valve box opening and close/seal it. The locking mechanism of the locking lid preferably consists of an actuator spindle that extends through the closure, and that is received in an actuator follower positioned therebelow. The actual follower is in pivotal engagement with a plurality of locking pawls, such that turning of the actuator spindle causes movement of the actuator follower and thus pivoting of the locking pawls—moving the locking pawls into a locked or unlocked position relative to a lid seat within the valve box.

10 Claims, 2 Drawing Sheets

US 6,763,967 B2

VALVE BOX LOCKING LID AND METHOD THEREFOR

RELATED APPLICATION

This non-provisional application claims priority from provisional application No. 60/376,484, filed on Apr. 29, 2002.

BACKGROUND OF THE INVENTION

1. Field of Invention

This invention relates generally to valve box locking lids for and, more specifically; to a valve box locking lid providing both a secure fit and improved debris protection.

2. Background of the Invention

Municipal utilities typically bury their mains under public rights of way, such as streets, at spaced intervals throughout the system. Normally, open shut-off valves are incorporated for the purpose of isolating main breaks so they can be repaired, or so new connections can be established.

The shut-off valves are frequently buried several feet beneath the street, and access pipes are provided which extend upwardly from the valve to near street level, ending in a valve box. The access pipe provides a passage for a tool which can be manipulated from street level to actuate the valve.

A cover assembly with a removable lid is usually incorporated in the pavement to cover the opening to the valve box, and possibly also to prevent debris from entering the access pipe. It has been customary to fabricate the cover assembly from cast iron. Cast iron has the advantages of being inexpensive and durable. Iron castings, however, are notorious for dimensional variations from one casting to the next. Consequently, it frequently is the case that there is a poor fit between the cover assembly and valve box—with the result that cover assemblies can become dislodged, creating a potential hazard.

Nevertheless, cast iron has remained the material of choice because it is strong and capable of withstanding the rigors to which a pavement-mounted assembly is subjected. It has more recently been recognized that quality cover assembly components can be modeled from light-weight synthetic polymeric material. U.S. Pat. No. 4,048,766, granted Sep. 20, 1977, to P. H. Dantzer et al. for "Closure Lid Assembly for Protective Housings" suggests the components be formed by a structural foam molding process. The light weight of the lid in the Dantzer et al. assembly requires that special retaining means and a locking system be provided in the design to prevent the lid from being accidentally dislodged. There continues to be a need for an access cover assembly which can be easily molded from polymeric material and which will perform reliably in service—providing both a secure fit (i.e., resisting dislodging), able to be removed in a convenient manner, and also preventing debris from entering the access pipe. The present invention satisfies these needs and provides other, related, advantages.

SUMMARY OF THE INVENTION

It is an object of the present invention to provide a light-weight valve box locking lid that provides a secure fit that will resist accidental dislodging.

It is a further object of the present invention to provide a light-weight valve box locking lid that provides a secure fit that will resist accidental dislodging and that further provides improved debris prevention.

It is yet a further object of the present invention to provide a light-weight valve box locking lid for an access pipe that may be removed in a convenient manner.

DETAILED DESCRIPTION OF THE PREFERRED EMBODIMENTS

Figure 1:
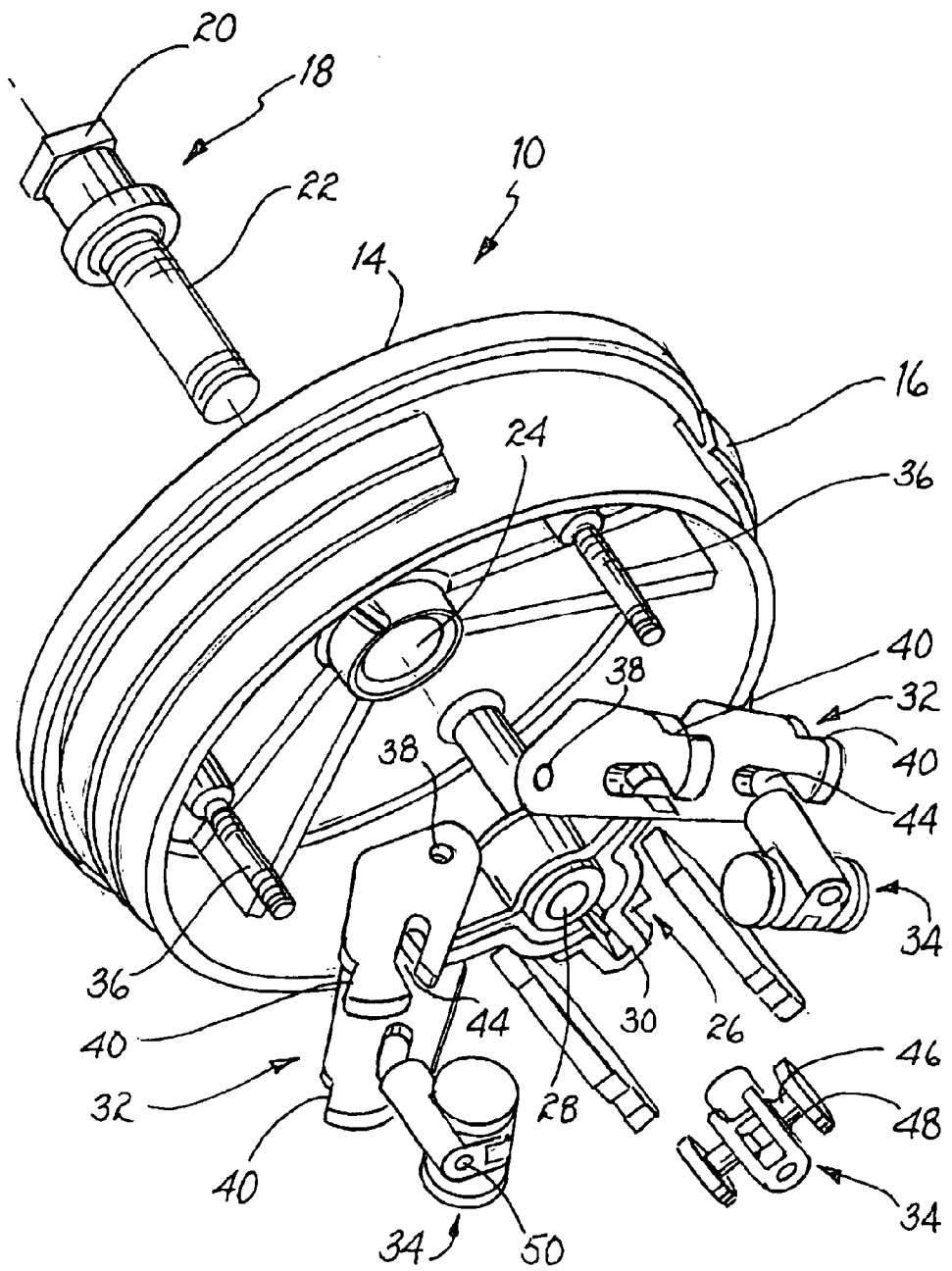
FIG. 1 is a perspective, exploded view of a valve box locking lid consistent with an embodiment of the present invention.
Figure 2:
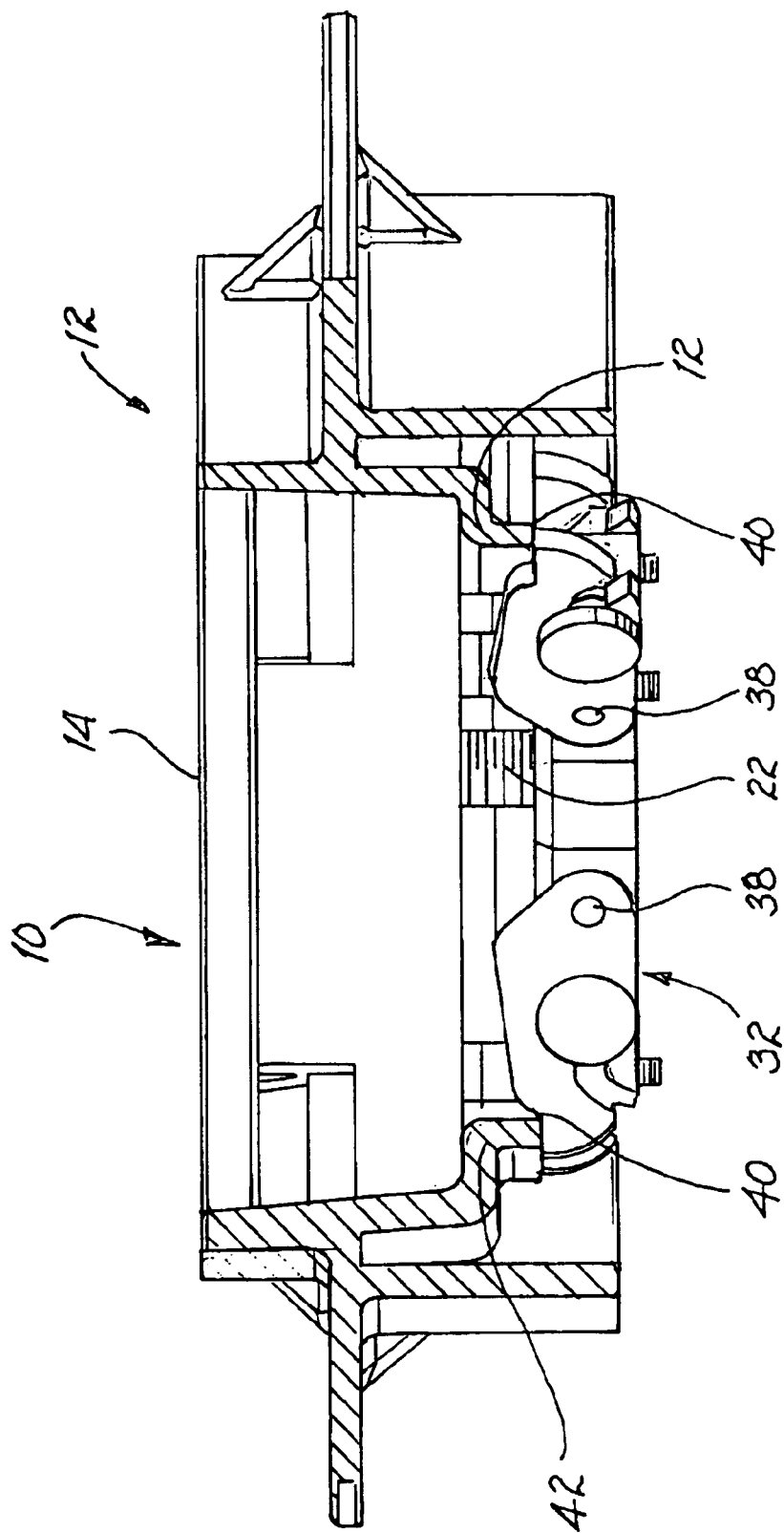
FIG. 2 is a side view of the locking lid of FIG. 1, in position within a valve box.

Referring first to FIG. 1, a locking lid 10 of the present invention is shown. The locking lid 10 is designed to be fitted within a valve box 12 (see FIG. 2), which valve box 12 is generally positioned in a street or other surface (not shown).

The locking lid 10 comprises a closure 14 and an annular external seal 16 positioned about the closure 14 and angled in an upward and outward direction as shown in FIG. 1. When the locking lid 10 is in position within the valve box 12, the closure 12 in combination with the external seal 16 prevents the passage of debris into the valve box 12, and also prevents unauthorized access into the valve box 12.

The components of the locking lid 10, the manner of operation of which will be described more fully below, further include the following: an actuator spindle 18 having a head 20 and a threaded shaft 22 and which threaded shaft 22 is inserted through opening 24 in the closure 14, an actuator follower 26 which comprises a threaded opening 28 positioned below the opening 24 and a plurality of arms 30 (preferably three) extending outward from the threaded opening 28, a locking pawl 32 pivotally positioned on a first end thereof to an arm 28 and proximate a second end thereof to a locking pawl retainer and pivot 34, and a threaded locking pawl retainer fastener 36 for each locking pawl retainer and pivot 34. Still referring to FIG. 1, the preferred construction of the locking lid 10 is described in additional detail. With respect first to the closure 14, it should be noted that its shape and size should conform to the opening of the valve box 12. While the closure 14 is shown as round in FIG. 1, it should be recognized that its shape may be varied as desired (e.g., rectangular, triangular, etc.) to conform to the opening of any valve box 14. It is preferred to construct the closure 14 from a plastic material, but metal or the like may also be utilized. The external seal 16 should preferably be formed of a rubber or elastomeric material.

The head 20 of the actuator spindle 18 is dimensioned, as desired, to be engaged by a mating turning tool (not shown). The head 20 is preferably recessed within the closure 14, so that an unauthorized person utilizing a crescent wrench or the like could not readily turn the head 20.

Referring now with more specificity to the locking pawl 32, each locking pawl 32 preferably comprises a two-piece assembly, with one piece coupled on each side of an arm 30 of the actuator follower 26. The individual pieces of the locking pawl 32 are preferably pivotally coupled at a first end through the insertion of a pin (not shown) through openings 38 in the locking pawl 32 and a mating opening (not shown) in the arm 30. At the second end of the locking pawl 32, at the outermost top side thereof, there is positioned a notched area 40. As shown more particularly in FIG. 2, when in a locked position, the notched area 40 contacts an underside of a lid seat 42 of the valve box 12—locking the locking lid 10 in place.

Each locking pawl 32 further includes a slotted portion 44. The slotted portion 44 permits pivotal retention of the locking pawl 32 to its corresponding locking pawl retainer and pivot 34, with a projection 46 fitting within the slotted portion 44 and a side button 48 being positioned to the outside (relative to the locking pawl retainer and pivot 34) of the locking pawl 32. This construction permits pivoting of the notched area 40 into and out of engagement with the lid seat 42, while restricting lateral movement of the locking pawls 32.

The locking pawl retainers and pivots 34 are fixedly retained in position relative to the locking pawl 32, with a threaded locking pawl retainer fastener 36. The threaded locking pawl retainer fastener 36, preferably, is a bolt or screw that is inserted through opening 50 in the locking pawl retainer and pivot 34.

Statement of Operation

A person desiring to position and lock the locking lid 10 within a valve box 12 will first position the locking lid 10 in the opening of the valve box 12. When first positioned, the locking lid 10 should be in an open configuration. Specifically, the actuator follower should be positioned relatively close to the underside of the closure 14, so that the locking pawls 32 will not interfere with the seating of the locking lid 10 proximate the lid seat 42.

To lock the locking lid 10 in place, a user will take the turning tool (not shown) and couple it to the head 20. The user will then turn the head 20 so as to cause the actuator follower 26 to travel downward toward the valve box 12. This will cause pivoting of the locking pawl 32 about each of the arms 30 and the locking pawl retainer and pivot 34. This should continue until the notched areas 40 contact the underside of the lid seat 42, and until no further turning of the turning tool in this direction is permitted. At this point, the locking lid 10 is locked in position.

To open the locking lid 10 and remove it from the valve box 12, a reversal of the turning motion is required—causing the notched areas 40 of the locking pawls 32 to retract from the underside of the lid seat 42, permitting the lifting of the locking lid 10.

While the invention has been particularly shown and described with reference to preferred embodiments thereof, it will be understood by those skilled in the art that the foregoing and other changes in form and details may be made therein without departing from the spirit and scope of the invention. For example, fewer or more than three arms 30 could be provided, together with a mating number of locking pawls 32. Moreover, the precise manner in which pivotal coupling of the locking pawls 32 to the arms 30, or to the locking pawl retainer and pivot 34, could be varied. It would also be possible to eliminate the notched area 40 on the locking pawls 32, with the un-notched outermost top side of the locking pawls 32 engaging the underside of the lid seat 42.

In addition, it has been discovered that the locking lid 10 of the present invention may be utilized with valve boxes 12 that lack an underside of a lid seat 42. With such valve boxes 12, the distal end of the locking pawls 32 are brought into contact with the walls of the valve box 12. The friction created as a result of such contact is sufficient to lock the locking lid 10 in position. With such valve boxes in particular, it is possible to eliminate the notched areas 40.

I claim:

1. A locking lid apparatus comprising, in combination:
   a closure;
   an annular external seal positioned about an exterior portion of said closure and projecting upwardly and outwardly;
   a threaded actuator spindle positioned through an opening in said closure;
   an actuator follower having a plurality of arms positioned below an underside of said closure;
   wherein said actual follower includes a threaded opening therein adapted to receive said threaded actuator spindle;
   a locking pawl pivotally coupled at a first end thereof to one said arm;
   wherein a second end of said locking pawl is adapted to engage an underside of a valve box lid seat;
   a locking pawl retainer and pivot adapted to pivotally retain said locking pawl proximate said second end thereof;
   wherein, when said closure is in position on a valve box, downward movement of said actuator follower causes said second end to move into engagement with said underside of said valve box lid seat.

2. The apparatus of claim 1 wherein said actuator follower has three arms.

3. The apparatus of claim 1 wherein said locking pawl comprises a two-piece assembly wherein one piece of said two-piece assembly is coupled to a first side of one said arm and a second piece of said two-piece assembly is coupled to a second side of said arm.

4. The apparatus of claim 3 wherein each said piece of said two-piece assembly has a slot therein, and wherein said slot is dimensioned to receive therein a projection from said locking pawl retainer and pivot.

5. The apparatus of claim 1 wherein said locking pawl includes a notched area positioned at said second end and wherein said notched area is adapted to engage said underside of said valve box lid seat.

6. A method for positioning a locking lid within a valve box in a secure and debris resistant manner comprising the steps of:
   providing a closure;
   providing an annular external seal positioned about an exterior portion of said closure and projecting upwardly and outwardly;
   providing a threaded actuator spindle positioned through an opening in said closure;
   providing an actuator follower having a plurality of arms positioned below an underside of said closure;
   wherein said actual follower includes a threaded opening therein adapted to receive said threaded actuator spindle;
   providing a locking pawl pivotally coupled at a first end thereof to one said arm;
   wherein a second end of said locking pawl is adapted to engage an underside of a valve box lid seat;
   providing a locking pawl retainer and pivot adapted to pivotally retain said locking pawl proximate said second end thereof;
   wherein, when said closure is in position on a valve box, downward movement of said actuator follower causes said second end to move into engagement with said underside of said valve box lid seat;
   positioning said locking lid in a valve box;
   turning said threaded actuator spindle so as to cause downward movement of said actuator follower, until said notched area moves into engagement with said underside of said valve box lid seat.

7. The method of claim 6 wherein said actuator follower has three arms.

8. The method of claim 6 wherein said locking pawl comprises a two-piece assembly wherein one piece of said two-piece assembly is coupled to a first side of one said arm and a second piece of said two-piece assembly is coupled to a second side of said arm.

9. The method of claim 8 wherein each said piece of said two-piece assembly has a slot therein, and wherein said slot is dimensioned to receive therein a projection from said locking pawl retainer and pivot.

10. The method of claim 6 wherein said locking pawl includes a notched area positioned at said second end and wherein said notched area is adapted to engage said underside of said valve box lid seat.

* * * * *